US00RE48624E

(19) United States
(12) Reissued Patent
Hsu et al.

(10) Patent Number: US RE48,624 E
(45) Date of Reissued Patent: Jul. 6, 2021

(54) EVENT DATA RECORDER WITH LOW POWER CONSUMPTION

(71) Applicant: PixArt Imaging Inc., Hsin-Chu (TW)

(72) Inventors: En-Feng Hsu, Hsin-Chu (TW); Ming-Tsan Kao, Hsin-Chu (TW)

(73) Assignee: PIXART IMAGING INC., Hsin-Chu County (TW)

(21) Appl. No.: 15/586,759

(22) Filed: May 4, 2017

Related U.S. Patent Documents

Reissue of:
(64) Patent No.: 9,025,037
Issued: May 5, 2015
Appl. No.: 13/589,193
Filed: Aug. 20, 2012

(30) Foreign Application Priority Data

Oct. 31, 2011 (TW) ..... 100139568

(51) Int. Cl.
*G07C 5/08* (2006.01)
*H04N 5/225* (2006.01)
*H04N 5/232* (2006.01)
*H04N 5/77* (2006.01)

(52) U.S. Cl.
CPC ..... *G07C 5/0866* (2013.01); *H04N 5/225* (2013.01); *H04N 5/23241* (2013.01); *H04N 5/772* (2013.01); *H04N 2201/3253* (2013.01)

(58) Field of Classification Search
CPC ..... G07C 5/0866; H04N 5/772; H04N 5/225; H04N 5/23241; H04N 2201/3253
USPC ..... 348/143–160
See application file for complete search history.

(56) References Cited

U.S. PATENT DOCUMENTS

2004/0183908 A1* 9/2004 Tominaga et al. ..... 348/159
2004/0212678 A1* 10/2004 Cooper et al. ..... 348/155
2004/0257462 A1* 12/2004 Goris et al. ..... 348/372
2007/0216951 A1* 9/2007 Shiraishi ..... 358/3.04
2009/0117861 A1* 5/2009 Hoefel et al. ..... 455/90.2
2009/0237034 A1* 9/2009 Lindemann ..... H02J 9/002 320/136
2013/0182065 A1* 7/2013 Chen ..... 348/36

FOREIGN PATENT DOCUMENTS

CN 1450794 10/2003
CN 1450794 A 10/2003
CN 1921551 2/2007
(Continued)

OTHER PUBLICATIONS

Life should be easy and simple (Jason, Sammy & Jasper), "FineVu CR-200HD (Mar. 26 adjusted)", link: http://blog.yam.com/hylind/article/35715136, Mar. 26, 2011, table 1 in p. 14.
(Continued)

*Primary Examiner* — Henry N Tran
(74) *Attorney, Agent, or Firm* — Hauptman Ham, LLP

(57) ABSTRACT

An event data recorder (EDR) is configured to operate in a driving mode and a parking mode. In the driving mode, the EDR is configured to perform high quality video recording using an image-capturing circuit. In the parking mode, the EDR is configured to periodically activate the image-capturing circuit for event detection and start to perform low quality video recording after detecting a specific event.

17 Claims, 2 Drawing Sheets

AMENDED

(56) References Cited

FOREIGN PATENT DOCUMENTS

| | | | |
|---|---|---|---|
| CN | 1921551 | A | 2/2007 |
| CN | 101763666 | | 6/2010 |
| CN | 101763666 | A | 6/2010 |
| CN | 201780687 | | 3/2011 |
| CN | 201780687 | U | 3/2011 |
| JP | 201178086 | | 4/2011 |
| JP | 201178086 | A | 4/2011 |
| JP | 2011143925 | | 7/2011 |
| JP | 2011143925 | A | 7/2011 |

OTHER PUBLICATIONS

Life should be easy and simple (Jason, Sammy & Jasper), "FineVu CR-200HD (Mar. 26 adjusted)", link: http://blog.yam.com/hylind/article/35715136, Mar. 26, 2011, table 1 in p. 18.

Lexus9, "An introduction for a newly baught event data recorder and the after-parking recording function", link: http://www.mobile01.com/topicdetail.php?f=397&t=1964069, Jan. 15, 2011.

* cited by examiner

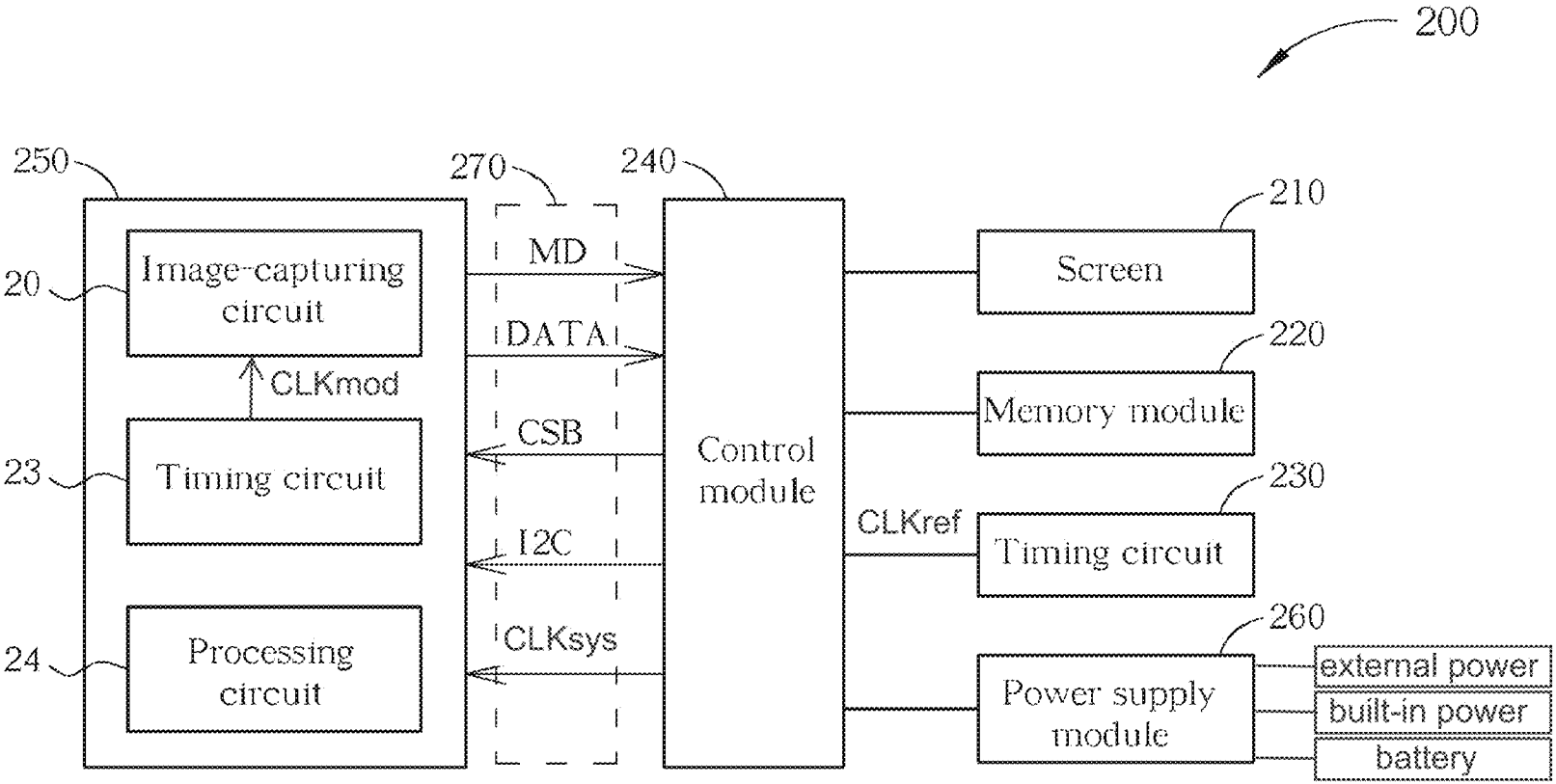
FIG. 2
AMENDED

EVENT DATA RECORDER WITH LOW POWER CONSUMPTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a broadening reissue of U.S. Pat. No. 9,025,037, issued on May 5, 2015, which is a U.S. Utility patent application Ser. No. 13/589,193, filed on Aug. 20, 2012, which is based upon and claims the benefit of priority to Taiwanese Patent Application No. 100139568, filed on Oct. 31, 2011. The disclosures of the above-listed applications are hereby incorporated by reference herein in their entirety.*

BACKGROUND OF THE INVENTION

1. Field of the Invention

The present invention is related to an event data recorder, and more particularly, to an event data recorder which reduces power consumption in the parking mode.

2. Description of the Prior Art

An event data recorder or EDR is a device installed in automobiles to record information related to vehicle, such as crashes, accidents or thefts. Police, crash investigators, and others can download the data from the EDR's memory to help them better understand what happened to the vehicle and how the safety systems performed, and in some cases, help establish culpability. An EDR normally provides two operational modes: the driving mode and the parking mode.

FIG. 1 is a functional diagram of a prior art EDR 100. The EDR 100 includes a screen 110, a memory module 120, a timing circuit 130, a control module 140, an image-recording module 150, a power supply module 160, and a transmitting interface 170. The image-recording module 150 is configured to perform video recording function. The screen 110 may display real-time images or previously recorded images. The memory module 120 is configured to store image data or the settings of the EDR 100. The timing circuit 130 is configured to provide reference clock signals for operating the EDR 100. The control module 140 is configured to control the operation of each device in the EDR 100. The transmitting interface 170 may be used for transmitting DATA, CSB, I2C and CLK signals.

In the driving mode, all devices in the EDR 100 are activated and the power supply module 160 may be provided by a car cigarette lighter. In the parking mode, the power supply module 160 may be provided by built-in or installed batteries of the EDR 100 or an automotive battery. Therefore, the operational time of the prior art EDR 100 is limited in the parking mode. The EDR 100 may fail to record events which occur after the automotive battery becomes flat, which also makes it difficult or unable to start the car.

SUMMARY OF THE INVENTION

The present invention provides an event data recorder having an image-recording module and a control module. The image-recording module includes an image-capturing circuit configured to perform a first video recording function in a first mode and perform a second video recording function or a photograph function in a second mode; a module timing circuit configured to periodically activate the image-capturing circuit in the second mode for performing the photograph function; and a processing circuit configured to detect a specific event according to an image obtained by the image-capturing circuit when performing the photograph function and output a wakeup signal when detecting the specific event. The control module is configured to activate the image-capturing circuit for performing the second video recording function when receiving the wakeup signal.

The present invention also provides an image-recording module including an image-capturing circuit configured to perform a video recording function in a first mode or perform a photograph function in a second mode; a module timing circuit configured to periodically activate the image-capturing circuit in the second mode for performing the photograph function; and a processing circuit configured to determine whether the image-capturing circuit should further perform the video recording function in the second mode according to photos obtained when the image-capturing circuit performs the photograph function.

The present invention also provides an image-recording module including a module timing circuit configured to provide a module clock signal; and an image-capturing circuit configured to receive an external system clock signal and perform a first image-capturing function accordingly in a first mode; and receive the module clock signal and perform a second image-capturing function accordingly in a second mode.

The present invention also provides an event data recorder including a built-in power, a power supply module configured to receive an external power or the built-in power, an image-recording module, and a control module. The image-recording module includes a module timing circuit configured to provide a module clock signal; and an image-capturing circuit configured to perform a first image-capturing function according to the external system clock signal when receiving the external system clock signal and perform a second image-capturing function according to the module clock signal when not receiving the external system clock signal. The control module is configured to send the system clock signal to the image-recording module when the power supply module receives the external power.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a functional diagram of an event data recorder according to the present invention.

DETAILED DESCRIPTION

Figure 1:
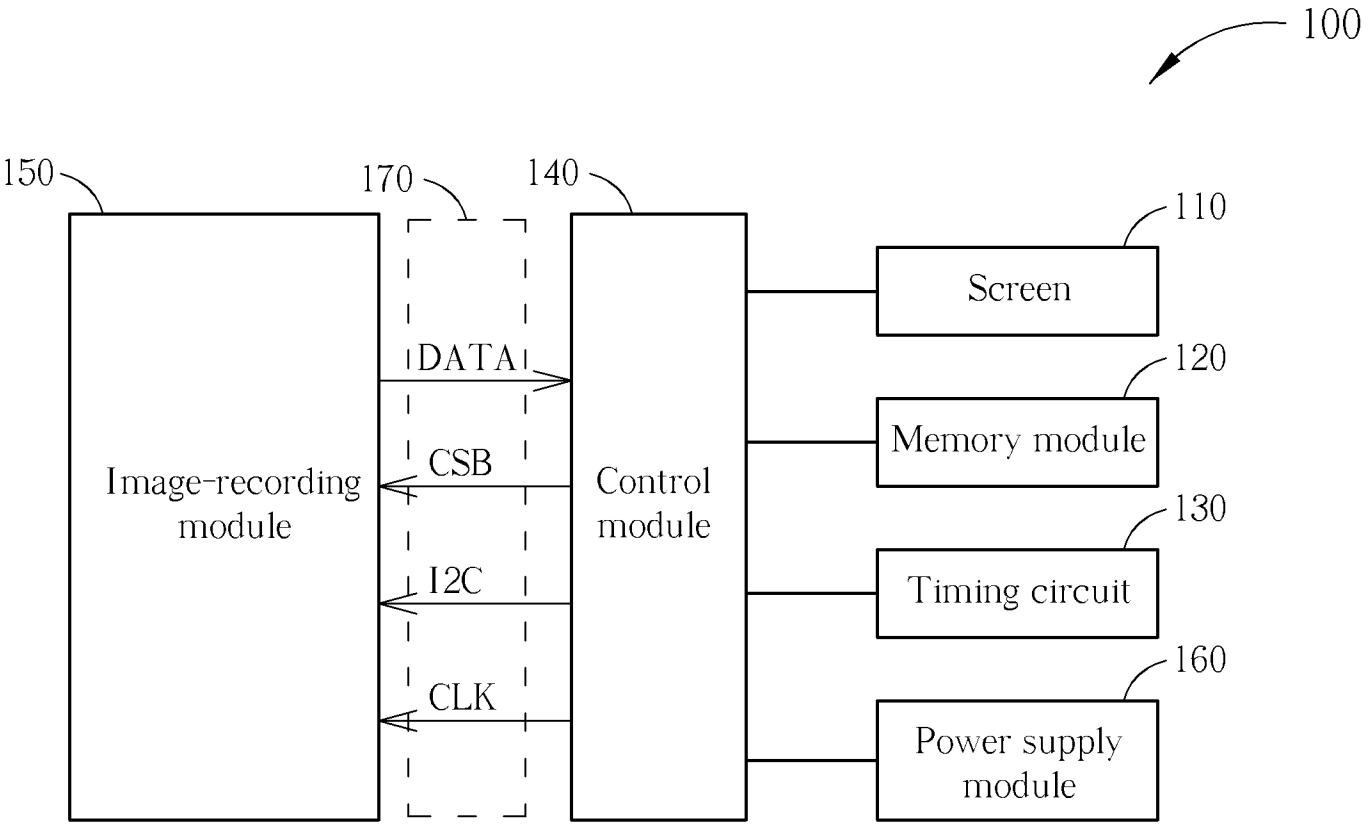
FIG. 1 PRIOR ART
FIG. 1 is a functional diagram of a prior art event data recorder.

FIG. 2 is a functional diagram of an EDR 200 according to the present invention. The EDR 200 includes a screen 210, a memory module 220, a timing circuit 230, a control module 240, an image-recording module 250, a power supply module 260, and a transmitting interface 270. The screen 210 may be a liquid crystal display capable of displaying real-time images or previously recorded images.

The memory module 220, which may include a buffer memory, a built-in memory/hard disc, or a module capable of communicating with an external memory/hard disc, is configured to store image data or the settings of the EDR 200. The timing circuit 230 may be a crystal oscillator configured to provide reference clock signals for operating the EDR 200. The control module 240 may be a back-end chip configured to control the operation of each device in the EDR 200. The image-recording module 250 may include one or multiple image-capturing circuits 20, a timing circuit 23, and a processing circuit 24.

The transmitting interface 270 includes a plurality of channels, via which the control module 240 and the image-recording module 250 may communicate with other. The image-recording module 250 may transmit a data signal DATA and a wakeup signal MD to the control module 240 via the transmitting interface 270. The control module 240 may transmit a serial data/address signal I2C (inter-integrated circuit), a chip select bus signal CBS and a clock signal CLK to the image-recording module 250 via the transmitting interface 270.

The EDR 200 is configured to determine its operational mode according to the presence of an external power: the EDR 200 may operate in the driving mode when the power supply module 260 is able to receive an external power; the EDR 200 may operate in the parking mode when the power supply module 260 is unable to receive an external power.

In the driving mode, all devices in the EDR 200 are activated and the power supply module 260 may be provided by a car cigarette lighter. The image-recording module 250 is configured to perform video recording function according to the serial data/address signal I2C, the chip select bus signal CBS and the clock signal CLK received from the control module 240. The control module is configured to display images on the screen 210 according to the data signal DATA, store the data signal DATA in the memory module 220, or simultaneously perform the above two actions.

In the parking mode, all devices in the EDR 200 are first de-activated and the power supply module [160] *260* may be provided by the built-in or installed batteries of the EDR 200, or by an automotive battery. Next, the timing circuit 23 of the image-recording module 250 is configured to periodically activate the image-capturing circuit 20 for detecting environmental changes around the car, based on which the processing circuit 24 is configured to determine whether a specific event has occurred. Upon detecting the specific event, the processing circuit 24 may send the wakeup signal MD for activating the control module 240, which may in turn activate other devices in the EDR 200 for performing video recording function.

In the driving mode according to the embodiment of present invention, the image-capturing circuit 20 may perform high quality video recording function, such as recording 30 HD-quality (1280*720 resolution) frames per second. In the parking mode according to the embodiment of present invention when no specific event is detected, the image-capturing circuit 20 may only perform low quality photograph function periodically, such as taking a VGA-quality (640*480 resolution) photo every 30 seconds. In the parking mode according to the embodiment of present invention when the specific event is detected, the image-capturing circuit 20 may perform low quality video recording, such as recording 15 HD-quality frames per second or 30 VGA-quality frames per second. Compared to the high quality video recording function in the driving mode, the low quality photograph function and the low quality video recording function consume less power, thereby capable of increasing the operational time of the image-capturing circuit 20 in the parking mode.

The specific event may be any environmental change which occurs around the car, such as an approaching pedestrian or vehicle. In the EDR 200 according to the embodiment of the present invention, the processing circuit 24 may be a low power signal processing circuit with event detection function. For example, the processing circuit 24 may compare two consecutive photos taken by the image-capturing circuit 20 in the parking mode. If the difference between an image parameter (such as luminance or chrominance) of the two consecutive photos is larger than a predetermined value, the processing circuit 24 may determine that the specific event has occurred around the car.

In the EDR 200 according to the embodiment of the present invention, the timing circuit 23 may be a low power crystal oscillator capable of providing reference clock signals for operating the image-recording module 250. Compared to the timing circuit 230, the timing circuit 23 only needs to provide low efficiency operation and thus consumes less power since the image-capturing circuit 20 does not require highly accurate timing control when performing low quality photograph function in the parking mode.

In the driving mode, the EDR 200 according to the embodiment of the present invention may also perform timing calibration. For example, the control module 240 may send the clock signal CLK generated by the timing circuit 230 to the image-recording module 250. The timing circuit 23 may thus adjust its output accordingly. Therefore, the timing circuits 23 and 230 may be synchronized when the EDR 200 enters the parking mode next time.

The present invention may provide a low power and multi-mode EDR. Data recorded in the driving mode may be used for investigating any driving incident. Data recorded in the parking mode when detecting a specific event may be used for understanding any incident near the parking location.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An event data recorder (EDR), comprising:

a built-in power supply;

an image-recording module, comprising:

an image-capturing circuit [configured to perform] *performing* a first video recording function in a driving mode and [perform] *performing* a second video recording function or a photograph function in a parking mode;

a module timing circuit only configured to periodically activate the image-capturing circuit in the parking mode for performing the photograph function; and a processing circuit [configured to detect] *detecting* a specific event according to an image obtained by the image-capturing circuit when performing the photograph function and [output] *outputting* a wakeup signal when detecting the specific event;

a control module configured to activate the image-capturing circuit for performing the second video recording function when receiving the wakeup signal; and a system timing circuit configured to provide a reference clock signal according to which the image-capturing circuit performs the first or the second video recording function, wherein the module timing circuit and the system timing circuit are different circuits;

*wherein the module timing circuit and the system timing circuit are different circuits;* wherein when the event data recorder is powered by an external power supply coupled to the event data recorder, the event data recorder is operated in the driving mode, and when the external power supply is no longer available to provide power to the event data recorder, the event data recorder is powered by the built-in power supply and is operated in the parking mode.

2. The EDR of claim 1, further comprising:

a memory module for storing a data obtained by the image-capturing circuit when performing the first or the second video recording function.

3. The EDR of claim 1, wherein the module timing circuit consumes less power than the system timing circuit.

4. The EDR of claim 1, wherein the control module is further configured to calibrate the module timing circuit according to the system timing circuit.

5. The EDR of claim 1, wherein the processing circuit consumes less power than the control module.

6. The EDR of claim 1, wherein the image-capturing circuit consumes less power when operating in the parking mode than when operating in the driving mode.

7. The EDR of claim 1, further comprising a transmitting interface for transmitting the wakeup signal.

8. An image-recording module, comprising:

an image-capturing circuit [configured to perform] *performing* a video recording function in a driving mode or [perform] *performing* a photograph function in a parking mode;

a module timing circuit configured to periodically activate the image-capturing circuit in the parking mode for performing the photograph function; and a processing circuit [configured to determine] *determining* whether the image-capturing circuit should further perform the video recording function in the parking mode according to photos obtained when the image-capturing circuit performs the photograph function, wherein a quality of the video recording function in the driving mode is higher than a quality of the photograph function in the parking mode;

wherein when an event data recorder comprising the image-recording module is powered by an external power supply coupled to the event data recorder, the image-recording module is operated in the driving mode, and when the external power supply is no longer available to provide power to the event data recorder, the event data recorder is powered by a built-in power supply and the image-recording module is operated in the parking mode.

9. An image-recording module, comprising:

a module timing circuit configured to provide a module clock signal; and an image-capturing circuit [configured to:]

[receive] *receiving* the module clock signal in a parking mode;

[perform] *performing* a photograph function only based on the module clock signal; and

[receive] *receiving* a system clock signal external to the image-recording module for performing a second video recording function when a specific event is detected according to images captured using the photograph function;

wherein when an event data recorder comprising the image-recording module is powered by an external power supply coupled to the event data recorder, the image-recording module is operated in a driving mode, and when the external power supply is no longer available to provide power to the event data recorder, the event data recorder is powered by a built-in power supply and the image-recording module is operated in the parking mode.

10. The image-recording module of claim 9, wherein the image-capturing circuit [is] further [configured to:]

[perform] *performs* a first video recording function in the driving mode when receiving the system clock signal or [perform] *performs* the second video recording function in the parking mode; and

[perform] *performs* the photograph function in the parking mode when not receiving the system clock signal.

11. An event data recorder (EDR), comprising:

a built-in power supply;

a power supply module configured to receive external power from an external power supply coupled to the event data recorder or built-in power from the built-in power supply;

an image-recording module, comprising:

a module timing circuit configured to provide a module clock signal;

an image-capturing circuit [configured to:]

when receiving a system clock signal external to the image-recording module, [perform] *performing* a first image-capturing function in a driving mode according to the system clock signal; and when not receiving the system clock signal, [perform] *performing* a second image-capturing function in a parking mode according to the module clock signal; and a processing circuit [configured to enable] *enabling* the image-capturing circuit for performing a second video recording function in the parking mode when determining that a difference between an image parameter of consecutive photos obtained when the image-capturing performs a photograph function is larger than a threshold value in the parking mode; and a control module configured to send the system clock signal to the image-recording module when the power supply module receives the external power;

wherein when the power supply module receives the external power, the event data recorder is operated in the driving mode, and when the external power supply is no longer available to provide power to the power supply module, the power supply module receives the built-in power and the event data recorder is operated in the parking mode.

12. The event data recorder of claim 11, wherein the first image-capturing function is a first video recording function.

13. The event data recorder of claim 11, wherein the second image-capturing function is the second video recording function or the photograph function.

*14. An event data recorder (EDR), comprising:*

*a built-in power supply;*

*an image-recording module configured to perform a first video recording function in a driving mode and perform a second video recording function or a photograph function in a parking mode, the image-recording module configured to output a wakeup signal when detecting a specific event; and*

*a control module configured to activate the image-recording module for performing the second video recording function when receiving the wakeup signal;*

*wherein when the event data recorder is powered by an external power supply coupled to the event data recorder, the event data recorder is operated in the driving mode, and when the external power supply is no longer available to provide power to the event data recorder, the event data recorder is powered by the built-in power supply and is operated in the parking mode.*

*15. An event data recorder (EDR), comprising:*

*a battery power supply;*

*an image-recording module configured to perform a first video recording function in a power supply mode and perform a second video recording function or a photograph function in a battery supply mode, the image-recording module configured to output a wakeup signal when detecting a specific event; and;*

*a control module configured to activate the image-recording module for performing the second video recording function when receiving the wakeup signal,*

*wherein when the event data recorder is powered by an external power supply coupled to the event data recorder, the event data recorder is operated in the power supply mode, and when the external power supply is no longer available to provide power to the event data recorder, the event data recorder is powered by the battery power supply and is operated in the battery supply mode.*

*16. An event data recorder (EDR), comprising:*

*a battery power supply;*

*an image-recording module configured to perform a first video recording function in a power supply mode and perform a second video recording function or a photograph function in a battery supply mode, the image-recording module configured to output a wakeup signal when detecting a specific event caused by difference between an image parameter of two consecutive photos; and*

*a control module configured to activate the image-recording module for performing the second video recording function when receiving the wakeup signal,*

*wherein when the event data recorder is powered by an external power supply coupled to the event data recorder, the event data recorder is operated in the power supply mode, and when the external power supply is no longer available to provide power to the event data recorder, the event data recorder is powered by the battery power supply and is operated in the battery supply mode.*

*17. An event data recorder (EDR), comprising:*

*a built-in power supply;*

*an image-recording module configured to perform a first video recording function in a first mode and perform a second video recording function or a photograph function in a second mode, the image-recording module configured to output a wakeup signal when detecting a specific event; and*

*a control module configured to activate the image-recording module for performing the second video recording function or the photograph function when receiving the wakeup signal,*

*wherein the event data recorder is powered by an external power supply coupled to the event data recorder when the event data recorder is operated in the first mode, and the external power supply is no longer available to provide power to the event data recorder when the event data recorder is powered by the built-in power supply and is operated in the second mode.*

* * * * *